G. T. HUBER.
BEARING FOR RECIPROCATING RODS.
APPLICATION FILED NOV. 1, 1917.
1,254,227.
Patented Jan. 22, 1918.
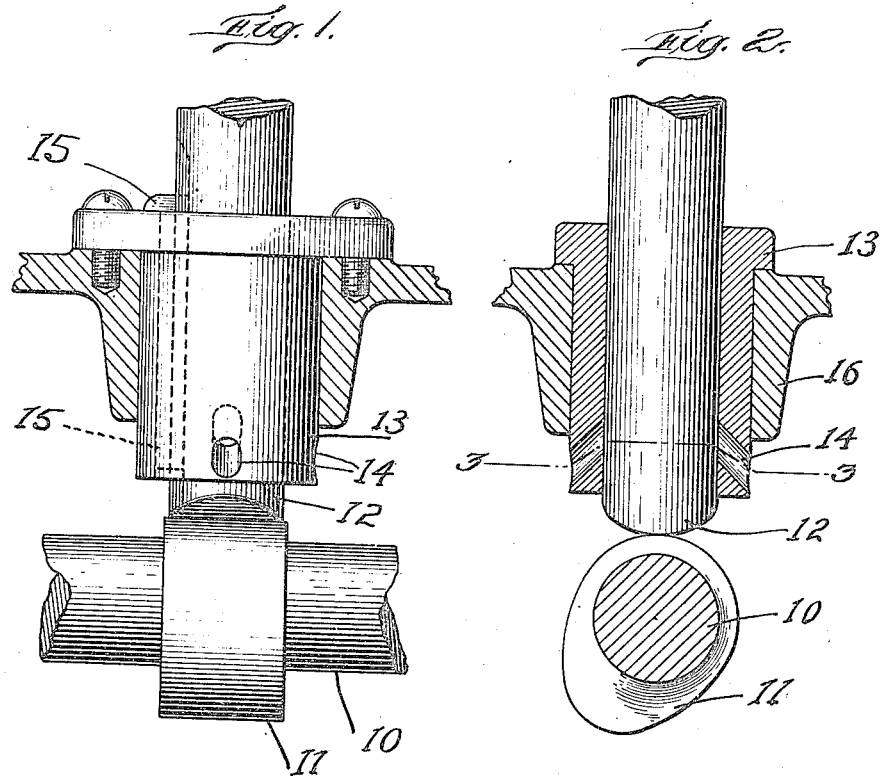
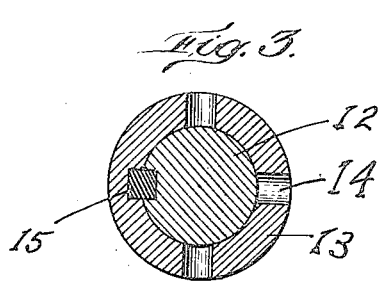
Inventor:
George T. Huber,
by Mitchell, Chadwick & Kent
attys

UNITED STATES PATENT OFFICE.

GEORGE T. HUBER, OF GLOUCESTER, MASSACHUSETTS, ASSIGNOR OF ONE-HALF TO ABBOTT S. COFFIN, OF GLOUCESTER, MASSACHUSETTS.

BEARING FOR RECIPROCATING RODS.

1,254,227.  Specification of Letters Patent.  Patented Jan. 22, 1918.

Application filed November 1, 1917. Serial No. 199,734.

*To all whom it may concern:*

Be it known that I, GEORGE T. HUBER, a citizen of the United States, residing at Gloucester, in the county of Essex and State of Massachusetts, have invented new and useful Improvements in Bearings for Reciprocating Rods, of which the following is a specification.

This invention relates to improvements in bearings for push rods, shafts and the like. More particularly it relates to means for controlling oil in such bearings. It is herein illustrated as it may be used in connection with a valve rod, operated by a cam in an internal combustion engine.

In such mechanism the cam shaft is often inclosed in a casing and is lubricated by a splash system which throws oil over the adjacent ends of the valve rods. These usually stand vertically above it and receive from its cams their characteristic longitudinal reciprocating motion. The oil creeps up along them, between each and its bearing, and thus affords needed lubrication. Incidentally even the best of bearings fail to bar the entrance of an excess of oil, and this escapes at the upper end of the bearing. In engines used for driving aeroplanes the high speed and the large number of the push rods combine to cause escape of a considerable amount of oil in this manner. The oil spreads over the outside of the engine and travels along to the propeller. Thence it is thrown through the air, and lands upon various parts of the planes, and also is thrown over the pilot and passengers, clouding goggles, injuring clothing and being generally disagreeable, as well as causing danger. In addition to these objections, there is a material waste of oil, and there is further loss by reason of necessary expense in removing it from the linen of the planes, to which it is injurious, by the labor of a company of scrub men using solvents for the oil. The present invention, which has been developed for the purpose of saving this waste, danger and expense, attains this end by the exceedingly simple device of drilling a few holes obliquely upward through the lower part of the bearing of each push rod.

Although the invention is here illustrated in only one form, it may be applied to other mechanisms and may be embodied in various forms. It is intended that the patent shall cover by suitable expression in the appended claims whatever features of patentable novelty exist in the invention disclosed.

In the accompanying drawings:—

Figure 1 is a side elevation of a fragment of cam shaft, with push rod and bearing;

Fig. 2 is an end elevation of the same, in section through the middle of the bearing but with the push rod and cam left intact, and the section through the shaft made beside the cam; and Fig. 3 is a transverse section through the push rod and its bearing on the irregular line 3—3 of Fig. 2.

Referring to the drawings, 10 indicates the cam shaft, 11 the cam upon it, and 12 the push rod whose lower curved surface rides on the cam and constitutes the cam follower. As the invention is applicable to any sort of a reciprocating rod in the bearing, it is deemed sufficient to show merely the lower end of such a rod, it being understood that the rod is connected by any suitable means to a valve or to other mechanism. Oil thrown upon the follower works up along the rod, being expedited by the reciprocating motion, which lifts it ever higher and leaves it at the top. The part 13, as illustrated, is a bushing of metal reamed to proper size for the push rod 12, but it is found in practice that whether the fit be light or loose the suction or other effect of the up and down motion, or the capillary attraction, or the characteristics of the oil itself or other causes, result in the said gradual loss of oil upward through the space between the convex surface of the push rod and the concave surface of its bearing piece 13. The aim of the invention to prevent this is attained by providing a series of holes 14 through the bearing, which, in the mechanism portrayed, run obliquely upward to the push rod at an angle about 45° from horizontal. It is found that three of these holes bored of cylindrical shape are sufficient to accomplish the purpose in a mechanism of the sort portrayed. They are placed at intervals of 90°, two of them being diametrically opposite each other. A spline 15 which prevents the push rod from rotating while permitting it to slide longitudinally with reciprocating motion occupies the remaining point of the quadrant. Doubtless more holes might be used without disadvantage; but it has been observed that the number and arrangement specified is adequate, and that enough oil remains for proper lubrication. The holes are located in the lower part of the bearing piece 13, so that their inner ends reach the lower part of the push rod and so that their outer ends are below the casing 16 covering the cam shaft and its oil bath. In operation, oil which starts upward around the push rod returns through the holes 14 and drips off into the tank below. While the precise manner of operation may not be known with certainty, it seems probable that oil which is moved upward on the surface of the push rod in the usual manner, particularly that which on an upward stroke of the rod has come opposite one of the holes 14, is scraped off from the surface of the rod by the lower lip of the inner end of the hole 14; and having been so scraped off runs down the incline of the lower side of that hole. This makes a cleared space on the surface of the rod, into which oil spreads from the laterally adjacent surface thereof, both by virtue of that inherent characteristic of oil which causes it to spread, and also perhaps by virtue of the pressure of the push rod against its bearing, which tends to express any oil that is present and to move it to any place that is free from oil, or free from pressure. At any rate the result is that oil which is creeping upward in a path between the holes is diverted to one or the other of the holes and passes out through it, instead of continuing till it reaches the upper end of the bearing. Experiment has shown the importance of making the holes lead downward from the surface of the push rod; and although the angle can doubtless be varied the angle at 45° illustrated has been found effective. The location of the holes near the lower edge of the bearing, of a point where a considerable length of bearing intervenes between them and the place to be guarded, seems also a feature of importance, for the skin tension or friction to be overcome in moving oil through the length of the bearing is considerably greater than that to be overcome in moving it laterally from a place between holes 14 to one of those holes. Moreover, the arrangement of the device at the lower end of the bearing permits the oil removed from the push rod by it to flow into the interior of the casing, where it can be conserved and continued in use.

It will be understood that the oil which is moving upward along the push rod is in the form of a thin film, too thin for gravity in the brief time to overcome the tension, the lift of the rod, and other opposing influences which tend to raise it; but the concentration of oil, gathered from an appreciable area each side of a hole 14, makes a sufficient mass in the still hole so that the force of gravity can exercise its usual effect and cause the oil to flow downward in that hole and to drip off.

The evil of creeping and wasting oil, above described, has been the subject of study for many years. I am not aware whether the true causes for it are known, nor whether the explanation which I have suggested above as to the manner in which my present invention works is correct in all respects; but the invention does unquestionably accomplish the result stated, i. e., it prevents the creeping of oil to the top of the bearing 13, and returns to the oil reservoir that which is on its way through the bearing and which in mechanisms not thus protected both goes to waste and causes damage and also danger. I am not aware that this result has ever been attained before, although means for preventing the loss has been much sought.

It is one feature of the present invention that the result is attained by a subtraction of material, devices heretofore proposed having required the addition of contrivances. This makes the improvement inexpensive to manufacture, and, in aeroplanes contributes to efficiency by the reduction of weight attained. In the course of operation of an aeroplane, the value of oil saved amounts to a considerable sum; the saving in labor and in deterioration of other parts of the plane injured by the escaped oil is also a very considerable sum; the efficiency of the aeroplane is increased, because reduction in consumption of oil permits full equipment at less weight; and the safety of the machine and its occupants is increased owing to the relief given to the eyes of the pilot from being blinded by the misty deposits of oil thrown through the air from the propeller. In the illustrative example used, and in other cases where the invention is applicable, as in internal combustion engines, in boats, or automobiles, the push rod gradually wears loose in its bearing, with the result that increased quantities of oil are thrown up and out. But the device of the invention is equally effective to handle the larger quantity, by reason of the scoop effect of the lower edge of the hole 14, which on the downward stroke of the rod easily plows under and at the same instant throws away from the surface of the rod whatever thickness of film lies thereon.

I claim as my invention:—

1. A device for controlling excess creeping of oil in the bearing of a reciprocating rod, comprising the provision of a hole leading obliquely through the bearing, backward with respect to the prevailing direction in which the oil is moving in the bearing, with adjacent parts adapted to permit escape of oil which enters the hole.

2. A device for controlling excess creeping of oil in the bearing of a rod moving longitudinally up and down, comprising the provision of a hole leading away and downward from a place in the interior surface of the bearing against which the rod rubs and adapted to drain oil which enters it.

3. A device for controlling excess creeping of oil in the bearing of a reciprocating rod, comprising the provision of a hole leading through the bearing from the surface of the rod obliquely backward with respect to the prevailing direction in which the oil is moving in the bearing, the hole being located near that end of the bearing at which the oil enters.

4. A device for controlling excess creeping of oil in the bearing of a reciprocating rod, including the provision of a hole leading obliquely through the bearing, backward with respect to the prevailing direction in which the oil is moving in the bearing, the rearward edge of the entrance of the hole being formed as an acute angle close to the surface of the rod, and the adjacent parts being adapted to permit escape of oil which enters the hole.

5. A device for controlling excess creeping of oil in the bearing of a reciprocating rod, comprising the provision of a plurality of holes arranged on various sides of the rod and leading therefrom obliquely through the bearing, backward with respect to the prevailing direction in which the oil is moving in the bearing, with adjacent parts adapted for the oil which enters the holes to be drained out.

6. The combination, with a reciprocating rod, means to cause its reciprocation and a bearing for the rod above said means, of a device for controlling excess creeping of oil through said bearing, comprising the provision of one or more holes leading obliquely outward and downward from the interior surface of the bearing.

7. The combination, with a cam shaft, a cam thereon, a rod extending upward therefrom and operated thereby, a casing around the cam adapted to hold oil, and a bearing for the rod, of a device for controlling excessive creeping of oil through the bearing, comprising the provision of holes leading downward and outward from the interior surface of the bearing and discharging oil therefrom to the interior of the casing.

Signed by me at Gloucester, Mass., this 27th day of October, 1917.

GEORGE T. HUBER.

Witnesses:
W. G. CLARK,
ALBERT BROWN.

Copies of this patent may be obtained for five cents each, by addressing the "Commissioner of Patents, Washington, D. C."